(12) United States Patent
Wu et al.

(10) Patent No.: US 8,295,174 B2
(45) Date of Patent: Oct. 23, 2012

(54) PROACTIVE UPLINK AGGREGATE MAXIMUM BIT RATE ENFORCEMENT

(75) Inventors: Wei Wu, Coppell, TX (US); Xiaoming Zhao, Plano, TX (US); Zhijun Cai, Euless, TX (US); James Earl Womack, Bedford, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 206 days.

(21) Appl. No.: 12/394,973

(22) Filed: Feb. 27, 2009

(65) Prior Publication Data

US 2009/0245108 A1 Oct. 1, 2009

Related U.S. Application Data

(60) Provisional application No. 61/040,523, filed on Mar. 28, 2008.

(51) Int. Cl.
*H04L 12/26* (2006.01)
(52) U.S. Cl. .......... 370/233; 370/235; 370/312
(58) Field of Classification Search .......... None
See application file for complete search history.

(56) References Cited

U.S. PATENT DOCUMENTS

| | | | | |
|---|---|---|---|---|
| 4,646,300 | A * | 2/1987 | Goodman et al. | 714/749 |
| 5,450,483 | A * | 9/1995 | Williams | 379/112.04 |
| 5,991,268 | A * | 11/1999 | Awdeh et al. | 370/236.1 |
| 6,504,818 | B1 | 1/2003 | Levine | 370/229 |
| 6,657,987 | B1 * | 12/2003 | Kumar et al. | 370/346 |
| 6,909,692 | B1 * | 6/2005 | Sharma et al. | 370/232 |
| 6,934,752 | B1 | 8/2005 | Gubbi | 709/225 |
| 7,283,471 | B2 * | 10/2007 | Gutierrez et al. | 370/230 |
| 7,346,045 | B2 * | 3/2008 | Montes Linares | 370/352 |
| 8,064,382 | B2 * | 11/2011 | Zisimopoulos et al. | 370/322 |
| 2002/0110084 | A1 * | 8/2002 | Butt et al. | 370/230 |
| 2002/0136163 | A1 * | 9/2002 | Kawakami et al. | 370/229 |
| 2004/0042476 | A1 * | 3/2004 | Peacock | 370/412 |
| 2006/0092837 | A1 | 5/2006 | Kwan et al. | 370/229 |

(Continued)

FOREIGN PATENT DOCUMENTS

EP 1187399 A1 3/2002

(Continued)

OTHER PUBLICATIONS

Zhao, Xiaoming, et al.; U.S. Appl. No. 12/052,902, filed Mar. 21, 2008; Title: Dynamic Aggregated Maximum Bit Rate for Evolved Packet System Non-guaranteed Bit Rate Quality of Service Enforcement and Network Bandwidth Utilization.

(Continued)

*Primary Examiner* — Chi H. Pham
*Assistant Examiner* — Shick Hom
(74) *Attorney, Agent, or Firm* — Conley Rose, P.C.; J. Robert Brown, Jr.

(57) ABSTRACT

A system and method for enforcing uplink aggregate maximum bit rate (AMBR) at a network gateway is provided. In one embodiment, a network gateway may inform one or more network access nodes that are sending data to the network gateway that a total data flow rate on a plurality of bearers from the one or more network access nodes to the network gateway exceeds a first threshold. Responsive to being informed that the total data flow rate exceeds the first threshold, the one or more network access nodes take an action to decrease the data flow rate from a plurality of user equipment that are sending data to the one or more network access nodes.

27 Claims, 7 Drawing Sheets

U.S. PATENT DOCUMENTS

| | | | |
|---|---|---|---|
| 2007/0081454 | A1 | 4/2007 | Bergamasco et al. ......... 370/229 |
| 2008/0037552 | A1 | 2/2008 | Dos Remedios et al. ................ 370/395.21 |
| 2008/0049787 | A1 | 2/2008 | McNaughton et al. ....... 370/468 |
| 2010/0118781 | A1* | 5/2010 | Petrovic et al. .............. 370/328 |
| 2010/0135229 | A1* | 6/2010 | Lohr et al. ................... 370/329 |
| 2011/0002306 | A1* | 1/2011 | Liu .............................. 370/331 |

FOREIGN PATENT DOCUMENTS

| | | |
|---|---|---|
| WO | 2007130281 A2 | 11/2007 |

OTHER PUBLICATIONS

Research in Motion Limited; EP Extended Search and Examination Report; EP Application No. 09155932.8; Aug. 10, 2009; 10 pgs.
Research in Motion Limited; EP Second Examination Report; EP Application No. 08153736.7; Jul. 8, 2009; 4 pgs.
Research in Motion Limited; EP Extended Search and Examination Report; EP Application No. 08153736.7; Jul. 4, 2008; 8 pgs.
Samsung; 3GPP TSG-SA WG2 Meeting #62; Title: AMBR Modification Procedure; Change Request; S2-080360; Marina Del Rey, US; Jan. 14-18, 2008; 12 pgs.
Ericsson, Alcatel-Lucent, AT&T, Qualcomm Europe, Motorola; 3GPP TSG SA WG2 Meeting #63; Title: AMBR per UE; Change Request; 52-081100; Athens, Greece; Feb. 18-22, 2008; 14 pgs.
Nokia Siemens Networks, Nokia; 3GPP TSG SA WG2 Meeting #63; Title: Solutions for AMBR per UE; TD S2-081514; Athens, Greece; Feb. 18-22, 2008; 2 pgs.
Vodafone; 3GPP SA 2 Meeting #63; Title: MME Overload Handling; Change Request; S2-081797; Athens, Greece; Feb. 18-22, 2008; 4 pgs.
Ipwireless, Nextwave; 3GPP TSG SA WG2 Architecture -S2#59; Title: Handling of AMBR in the Multiple PDN Connection Scenario; S2-073435; Helsinki, Finland; Aug. 27-31, 2007; 7 pgs.
3GPP TS 23.401v1.2.1; 3rd Generation Partnership Project; Technical Specification Group Services and System Aspects; GPRS Enhancements for E-UTRAN Access; Release 8; Sep. 2007; 87 pgs.
3GPP TS 23.401v8.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2007; Part 1; 99 pgs.
3GPP TS 23.401v8.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Dec. 2007; Part 2; 68 pgs.
3GPP TSG SA WG2 Meeting #63; Title: "AMBR per UE"; S2-081100; Feb. 18-22, 2008; Athens, Greece, 12 pgs.
3GPP TSG-SA WG2 Meeting #62; Title: "AMBR Modification Procedure"; S2-080360; Jan. 14-18, 2008; Marina Del Rey; 12 pgs.
3GPP TSG SA WG2 Architecture—S2#59; Title: "Handling of AMBR in the Multiple PDN Connection Scenario"; S2-073435; Aug. 27-31, 2007; Helsinki, Finland; 7 pgs.
Office Action dated Nov. 30, 2009; 20 pages; U.S. Appl. No. 12/052,902, filed Mar. 21, 2008.
Final Office Action dated May 18, 2010; 13 pages; U.S. Appl. No. 12/052,902, filed Mar. 21, 2008.
Office Action dated Aug. 19, 2010; 15 pages; U.S. Appl. No. 12/052,902, filed Mar. 21, 2008.
Interview Summary dated Nov. 26, 2010; 3 pages; U.S. Appl. No. 12/052,902, filed Mar. 21, 2008.
EP Third Examination Report; EP Application No. 08153736.7; Nov. 30, 2009; 4 pgs.
EP Decision to Grant; EP Application No. 08153736.7; Sep. 9, 2010; 1 pg.
European Search and Examination Report; European Patent Application No. 10184047.8; Mar. 15, 2011; 9 pgs.
Office Action dated Aug. 5, 2011; 15 pages; U.S. Appl. No. 12/052,902, filed Mar. 21, 2008.
Canadian Office Action; CA Application No. 2,658,540; Jul. 26, 2011; 4 pgs.
Canadian Office Action; CA Application No. 2,659,866; Jul. 22, 2011; 3 pgs.
Final Office Action dated Apr. 6, 2011; 16 pages; U.S. Appl. No. 12/052,902, filed Mar. 21, 2008.
European Extended Search Report; Application No. 11174363.9; Sep. 13, 2011; 9 pages.
Notice of Allowance dated Mar. 7, 2012; U.S. Appl. No. 12/052,902, filed Mar. 21, 2008; 13 pages.

* cited by examiner

Fig. 6
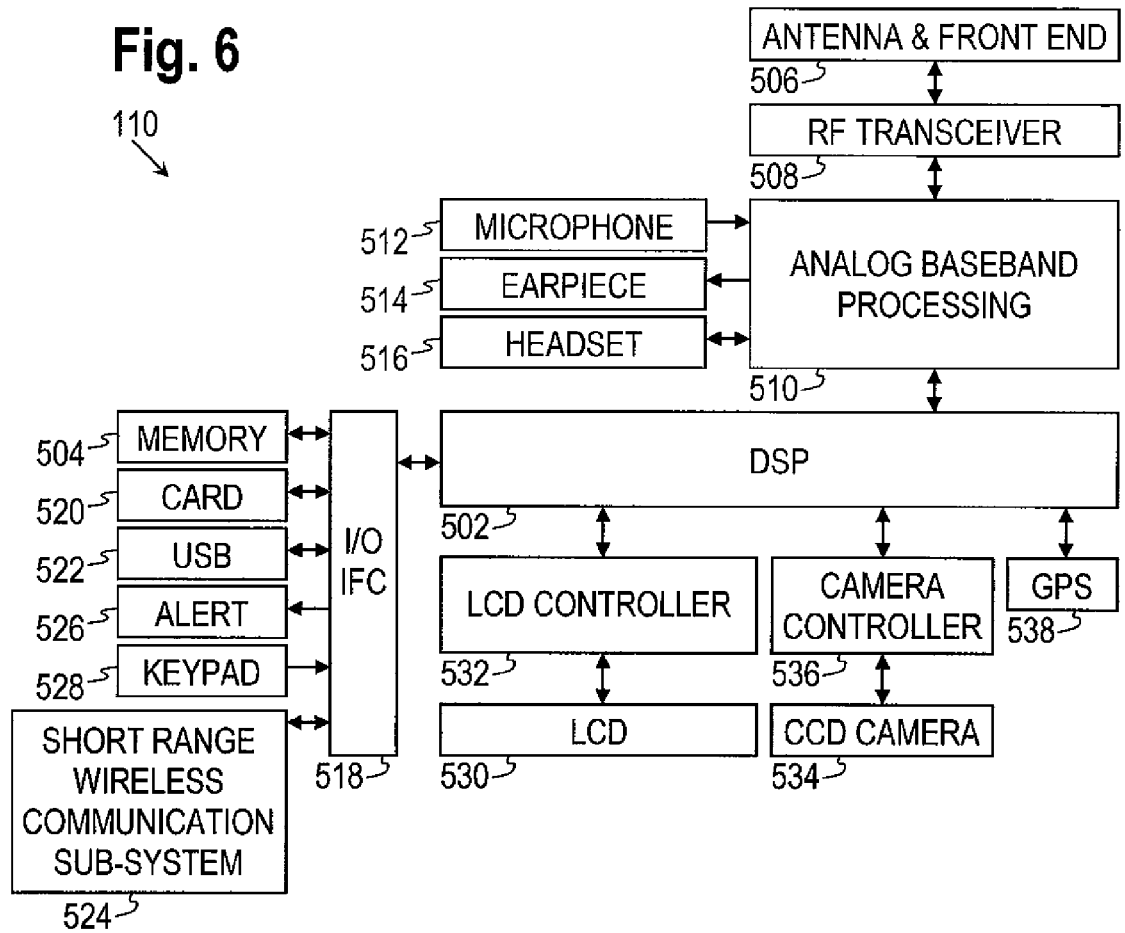
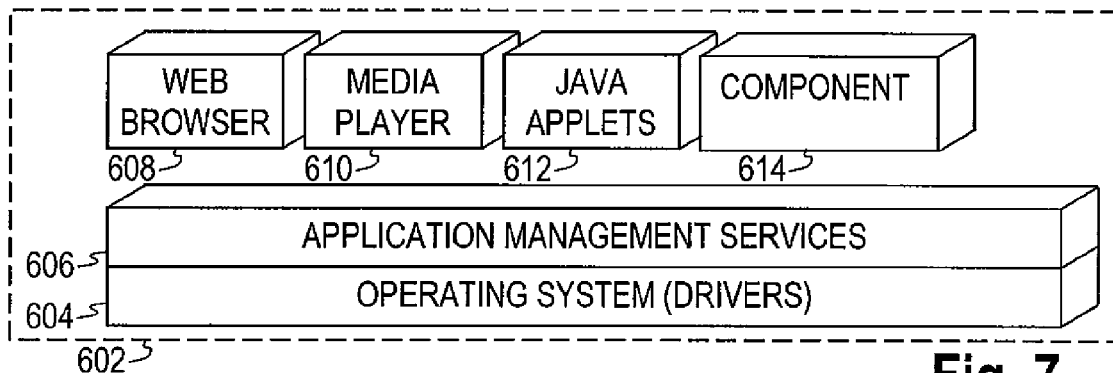
Fig. 7

PROACTIVE UPLINK AGGREGATE MAXIMUM BIT RATE ENFORCEMENT

CROSS-REFERENCE TO RELATED APPLICATIONS

The present application claims priority to U.S. Provisional Patent Application No. 61/040,523, filed Mar. 28, 2008, by Wei Wu, et al, entitled "Proactive Uplink Aggregate Maximum Bit Rate Enforcement", which is incorporated by reference herein as if reproduced in its entirety.

BACKGROUND

Easily transportable devices with wireless telecommunications capabilities, such as mobile telephones, personal digital assistants, handheld computers, and similar devices, will be referred to herein as user equipment (UE). The term "UE" may refer to a device and its associated Universal Integrated Circuit Card (UICC) that includes a Subscriber Identity Module (SIM) application, a Universal Subscriber Identity Module (USIM) application, or a Removable User Identity Module (R-UIM) application or may refer to the device itself without such a card. The term "UE" may also refer to devices that have similar capabilities but that are not transportable, such as a desktop computer or a set-top box. A connection between a UE and some other element in a telecommunications network might promote a voice call, a file transfer, or some other type of data exchange, any of which can be referred to as a call or a session.

Some UEs communicate in a circuit switched mode, wherein a dedicated communication path exists between two devices. For the duration of a call or session, all data exchanged between the two devices travels along the single path. Some UEs have the capability to communicate in a packet switched mode, wherein a data stream representing a portion of a call or session is divided into packets that are given unique identifiers. The packets might then be transmitted from a source to a destination along different paths and might arrive at the destination at different times. Upon reaching the destination, the packets are reassembled into their original sequence based on the identifiers.

Communications that take place via circuit switching can be said to occur in the circuit switched domain and communications that take place via packet switching can be said to occur in the packet switched domain. Within each domain, several different types of networks, protocols, or technologies can be used. In some cases, the same network, protocol, or technology can be used in both domains. The wireless communication networks may be based on Code Division Multiple Access (CDMA), Time Division Multiple Access (TDMA), Frequency Division Multiple Access (FDMA), Orthogonal Frequency Division Multiplexing (OFDM), or some other multiple access scheme. A CDMA-based network may implement one or more standards such as 3GPP2 IS-2000 (commonly referred to as CDMA 1x), 3GPP2 IS-856 (commonly referred to as CDMA 1xEV-DO), or 3GPP UMTS (Universal Mobile Telecommunications System). The modes of access for UMTS are referred to as Universal Terrestrial Radio Access (UTRA). A TDMA-based network may implement one or more standards such as 3 GPP Global System for Mobile Communications (GSM) or 3GPP General Packet Radio Service (GPRS).

GSM is an example of a wireless network standard that uses only the circuit switching mode. Examples of wireless network standards that use only packet switching include GPRS, CDMA 1x EV-DO, Worldwide Interoperability for Microwave Access (WiMax), and Wireless Local Area Network (WLAN), which might comply with Institute of Electrical and Electronics Engineers (IEEE) standards such as 802.16, 802.16e, 802.11a, 802.11b, 802.11g, 802.11n, and similar standards. Examples of wireless network standards that may use both circuit switching and packet switching modes include CDMA 1x and UMTS. The IP (Internet Protocol) Multimedia Subsystem (IMS) is a packet switched technology that allows multimedia content to be transmitted between UEs.

In traditional wireless telecommunications systems, transmission equipment in a base station transmits signals throughout a geographical region known as a cell. As technology has evolved, more advanced equipment has been introduced that can provide services that were not possible previously. This advanced equipment might include, for example, an enhanced node B (ENB) rather than a base station or other systems and devices that are more highly evolved than the equivalent equipment in a traditional wireless telecommunications system. Such advanced or next generation equipment may be referred to herein as long-term evolution (LTE) equipment, and a packet-based network that uses such equipment can be referred to as an evolved packet system (EPS).

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a block diagram of user equipment operable for some of the various embodiments of the disclosure.

FIG. 7 is a diagram of a software environment that may be implemented on user equipment operable for some of the various embodiments of the disclosure.

DETAILED DESCRIPTION

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

According to one embodiment, a method is provided for enforcing uplink aggregate maximum bit rate (AMBR) at a network gateway. The method comprises sending a data flow rate overflow message to one or more network access nodes when a total data flow rate from the one or more network access nodes to the network gateway exceeds a first threshold related to the AMBR.

In another embodiment, a method is provided for enforcing uplink aggregate maximum bit rate in one or more network access nodes. The method comprises receiving a data flow rate overflow message from a network gateway at one or more of the network access nodes. The method further comprises one or more of the network access nodes taking action to decrease the data flow rate from at least one user equipment that is sending data to the one or more network access nodes.

In another embodiment, a system is provided for preventing a total data flow rate to a single network gateway from exceeding an aggregate maximum bit rate (AMBR) applicable to the network gateway. The system comprises a processor in the network gateway configured to inform one or more network access nodes that are sending data from a plurality of user equipment to the network gateway that the total data flow rate exceeds a first threshold related to the AMBR.

In another embodiment, a system is provided for reducing a total data flow rate to a single network gateway to reduce the likelihood of exceeding an aggregate maximum bit rate applicable to the network gateway. The system comprises a processor related to a network access node configured, responsive to receiving a message from the network gateway that the total data flow rate exceeds a first threshold, to decrease the data flow rate to the network gateway.

Figure 1:
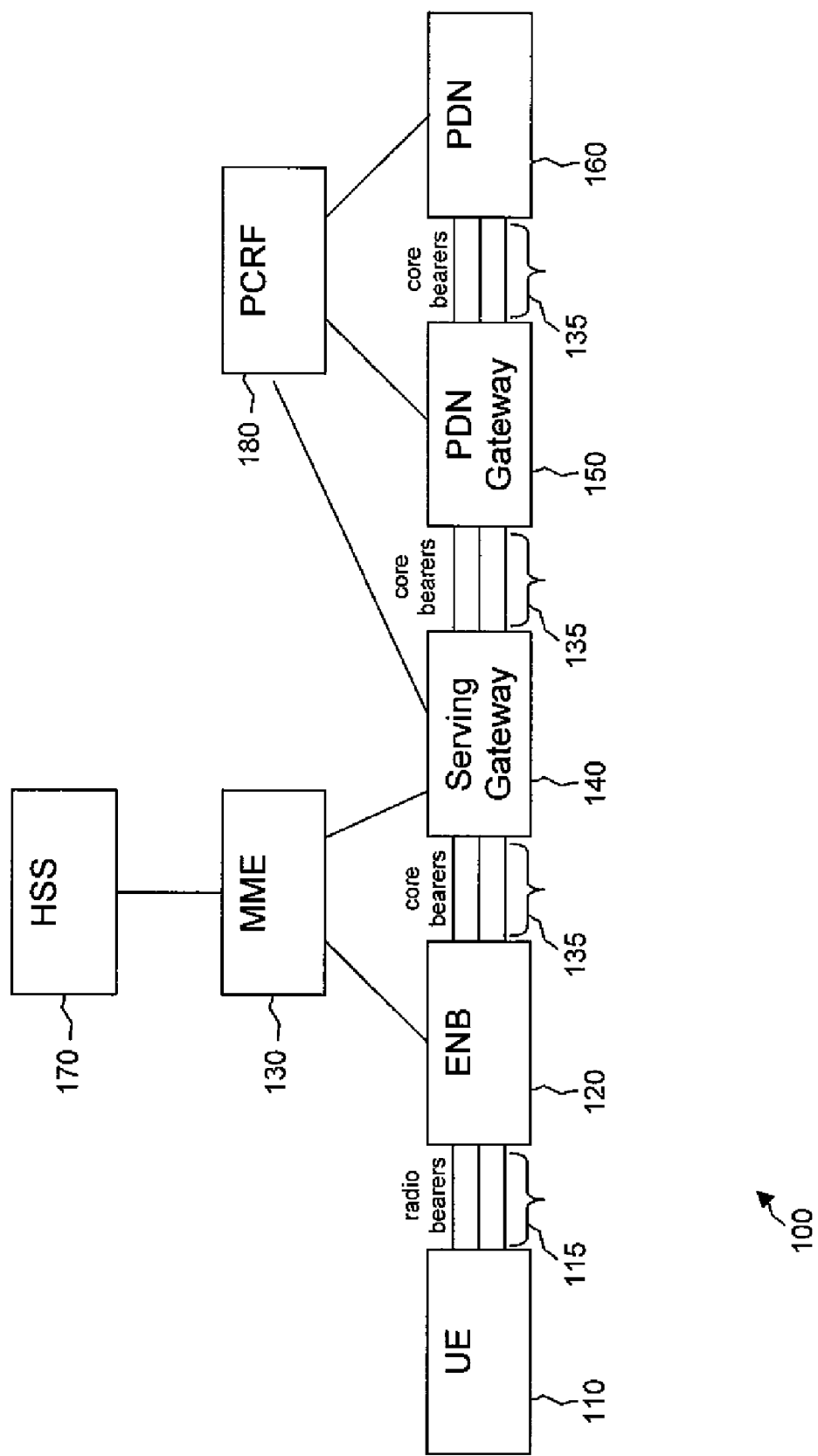
FIG. 1 is an illustration of a wireless telecommunications system according to an embodiment of the disclosure.

FIG. 1 illustrates an exemplary wireless telecommunications system 100 according to an embodiment of the disclosure. It should be noted that some of the lines connecting the components in FIG. 1 might represent bearer connections and some of the lines might represent signaling connections. Traditionally, different styles of lines are used to represent the different types of connections. However, for the sake of clarity in the drawing, the different types of connections in FIG. 1 are represented by the same style of line. Also, other connections that are not shown might exist between the components in FIG. 1.

The system 100 includes a UE 110 that can connect to a packet data network (PDN) 160. Although only one UE 110 and one PDN 160 are shown, a plurality of UEs 110 could be present, each of which could connect to a plurality of PDNs 160. The PDN 160 might be an Internet-based network or might be another type of network that can provide packet-based data. The PDN 160 can allow access to packet-based services, such as World Wide Web pages, multimedia broadcast/multicast services, and other data packet-based services. To access the PDN 160, the UE 110 might establish one or more radio bearer connections 115 with an ENB 120, a base station, or a similar component. While only one ENB 120 is shown, multiple ENBs 120 could be present, and multiple UEs 110 could connect to each of them.

The UE 110 may connect, via the ENB 120, to a serving gateway 140, which can also be referred to as a mobile access gateway (MAG). The serving gateway 140 terminates the user plane interface of the radio access portions of the system 100. The UE 110 may also connect, via the ENB 120, to a mobility management entity (MME) 130, which then connects to the serving gateway 140. The MME 130 terminates the control plane interface of the radio access portions of the system 100.

The serving gateway 140 forwards packets to the PDN 160 via a PDN gateway 150. While a single PDN gateway 150 is shown providing access to a single PDN 160, a plurality of PDN gateways 150 might be present, each of which could connect to a plurality of ENBs 120, and each of which could provide access to a plurality of PDNs 160. The serving gateway 140, the PDN gateway 150, and the PDN 160 communicate via one or more core bearers 135. There is a one-to-one correspondence between the radio bearers 115 and the core bearers 135. That is, for each connection the UE 110 has to the PDN gateway 150, there is also a connection to the ENB 120.

A home subscriber server (HSS) 170, an authentication/authorization accounting (AAA) server, or a similar component, can connect to the MME 130 (and other core network entities) and can store data related to services available to the UE 110, billing policies for the UE 110, and similar UE profile data. If dynamic policy and charge control (PCC) rules are deployed in the system 100, a policy control and charging rules function (PCRF) 180, or a similar component, might be present. The PCRF 180 can connect to the serving gateway 140, the PDN gateway 150, and/or the PDN 160, and can store policies related to the connections between the ENB 120 and the PDN gateway 150.

The UE 110 might connect to a plurality of PDN gateways 150 concurrently via the ENB 120, the serving gateway 140, and a plurality of radio bearer connections 115 and a plurality of core bearer connections 135. This could provide the UE 110 with fast access to multiple PDNs 160. For example, the UE 110 might use a first radio bearer 115 and a first core bearer 135 to connect to a first PDN 160 in order to access the World Wide Web and use a second radio bearer 115 and second core bearer 135 to connect to a second PDN 160 in order to access a video download. The use of such concurrent bearers could allow the user to quickly switch between the two PDNs 160. Based on the UEs' quality of service (QoS) profiles, the radio bearers 115 and core bearers 135 might conform to a set of QoS requirements, such as a guaranteed bit rate, a maximum bit rate, a packet delay budget, a packet loss rate, and other parameters of data transfer quality.

Bearer traffic can be classified into two categories: Guaranteed Bit Rate (GBR) and non-Guaranteed Bit Rate (non-GBR). On a GBR bearer, a specified bandwidth is reserved and remains available as long as the bearer remains in place. A GBR bearer might be established for services with strict bandwidth requirements, such as streaming video. Services such as email that have more flexible bandwidth requirements might use non-GBR bearers, for which a specified bandwidth is not reserved.

For non-GBR bearers, QoS can be enforced by a QoS Class Indicator (QCI), an Allocation and Retention Priority (ARP), and an Aggregate Maximum Bit Rate (AMBR). The QCI, ARP, and AMBR are typically stored in the UE's QoS profile. When the UE 110 attaches to a network, the MME 130 can retrieve these parameters from the HSS 170 and send them to the ENB 120 for QoS enforcement on uplinks and to the PDN gateway 150 or the PCRF 180 for QoS enforcement on downlinks. The AMBR can be considered a total bandwidth available to be shared among all the non-GBR radio bearers 115 between the UE 110 and the ENB 120 or among all the non-GBR core bearers 135 between the UE 110 and the PDN 160. The same AMBR is used by the radio bearers 115 and the core bearers 135.

An AMBR can be defined for one UE 110 connected to one ENB 120 and/or one PDN 160, for one UE 110 connected to a plurality of ENBs 120 and/or a plurality of PDNs 160, for a plurality of UEs 110 connected to one ENB 120 and/or one PDN 160, or for a plurality of UEs 110 connected to a plurality of ENBs 120 and/or a plurality of PDNs 160. A single UE 110 can utilize the total AMBR if there is only a single radio bearer 115 between the UE 110 and the ENB 120 or a single core bearer 135 between the UE 110 and the PDN 160. If the UE 110 is connected to multiple active radio bearers 115 or multiple active core bearers 135, the bearers share the AMBR. A plurality of bearers might share an AMBR equally or each might receive a different proportion of an AMBR.

Figure 2:
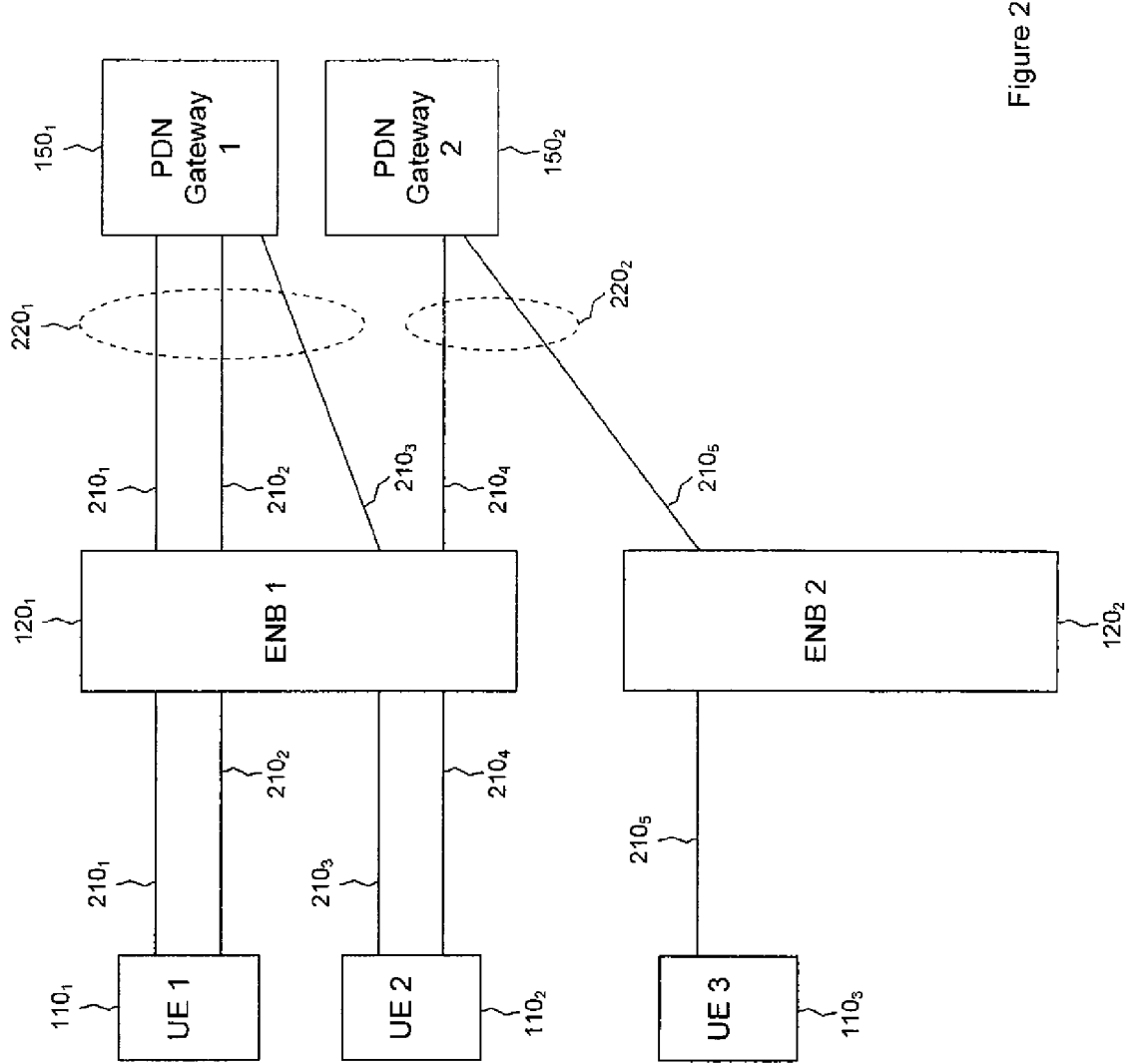
FIG. 2 is an alternative illustration of a wireless telecommunications system according to an embodiment of the disclosure.

FIG. 2 illustrates a simplified version of the system 100 of FIG. 1. In this example, a first UE $110_1$ connects to a first ENB $120_1$ via a first non-GBR bearer $210_1$ and a second non-GBR bearer $210_2$. A second UE $110_2$ connects to the first ENB $120_1$ via a third non-GBR bearer $210_3$ and a fourth non-GBR bearer $210_4$. A third UE $110_3$ connects to a second ENB $120_2$ via a fifth non-GBR bearer $210_5$. The first bearer $210_1$, the second bearer $210_2$, and the third bearer $210_3$ continue from the first ENB $120_1$ to a first PDN gateway $150_1$. The fourth bearer $210_4$ continues from the first ENB $120_1$ to a second PDN gateway $150_2$. The fifth bearer $210_5$ continues from the second ENB $120_2$ to the second PDN gateway $150_2$. In other cases, other numbers of these components could be present and the components could be connected in other manners.

In example of FIG. 2, AMBRs are specified for the bearers 210 on a per-PDN gateway 150 basis. That is, the AMBR is the total allowed non-GBR traffic for a single PDN gateway 150, and a different AMBR could apply to the total traffic to or from each of the PDN gateways 150. For example, a first AMBR $220_1$ could apply to data on the bearers $210_1$, $210_2$, and $210_3$ connected to the first PDN gateway $150_1$, and a second AMBR $220_2$ could apply to data on the bearers $210_4$ and $210_5$ connected to the second PDN gateway $150_2$. For downlink traffic, the first PDN gateway $150_1$ can ensure that the total downlink data flows on bearers $210_1$, $210_2$, and $210_3$ do not exceed the first AMBR $220_1$, and the second PDN gateway $150_2$ can ensure that the total downlink data flows on bearers $210_4$ and $210_5$ do not exceed the second AMBR $220_2$.

For uplink traffic, the data flow rates on each of the bearers 210 are controlled by the ENBs 120. A single ENB 120 can ensure that the total non-GBR data flow rate on one or more bearers 210 between itself and a single PDN gateway 150 does not exceed the AMBR applicable to that PDN gateway 150. For example, the first ENB $120_1$ can ensure that the total uplink data flows on bearers $210_1$, $210_2$, and $210_3$ to the first PDN gateway $150_1$ do not exceed the first AMBR $220_1$ and can also ensure that the uplink data flow on bearer $210_4$ to the second PDN gateway $150_2$ does not exceed the second AMBR $220_2$. The second ENB $120_2$ can ensure that the uplink data flow on bearer $210_5$ to the second PDN gateway $150_2$ does not exceed the second AMBR $220_2$.

However, neither of the ENBs 120 has information on non-GBR traffic flow rates from its peer ENB 120 to the PDN gateways 150. One of the ENBs 120 could send data to one of the PDN gateways 150 at a flow rate that is a significant portion of the AMBR for that PDN gateway 150 without being aware that the other ENB 120 is also sending data to the same PDN gateway 150. Therefore, when bearers 210 from different ENBs 120 carry data at a relatively high flow rate to a single PDN gateway 150, the total data flow on the bearers 210 could exceed the AMBR for that PDN gateway 150.

This is illustrated in FIG. 2 by bearers $210_4$ and $210_5$ from the first ENB $120_1$ and the second ENB $120_2$, respectively. The total uplink data flow into the second PDN gateway $150_2$ is the combination of the data flows on bearers $210_4$ and $210_5$ and is limited to the second AMBR $220_2$. However, since the first ENB $120_1$ has no knowledge of the data flow on bearer $210_5$ from the second ENB $120_2$, and the second ENB $120_2$ has no knowledge of the data flow on bearer $210_4$ from the first ENB $120_1$, each of the ENBs 120 might assume that the full second AMBR $220_2$ is available to it. This might cause the first ENB $120_1$ to attempt to place a data flow up to the second AMBR $220_2$ on bearer $210_4$, and might concurrently cause the second ENB $120_2$ to attempt to place a data flow up to the second AMBR $220_2$ on bearer $210_5$. If the total data flow that the first ENB $120_1$ and the second ENB $120_2$ concurrently attempt to place on bearers $210_4$ and $210_5$ exceeds the second AMBR $220_2$, an overflow condition could exist.

In addition, the total data flow that the first ENB $120_1$ and the second ENB $120_2$ concurrently attempt to place on bearers $210_4$ and $210_5$ might approach, but not exceed, the second AMBR $220_2$. In such a case, data traffic congestion may limit the available bandwidth at the second PDN gateway $150_2$. Such a condition will be referred to herein as a pseudo-overflow.

An overflow or pseudo-overflow could cause the second PDN gateway $150_2$ to drop or delay data packets sent over bearers $210_4$ and/or $210_5$. The dropping of packets could lead to a waste of resources since the dropped packets would need to be retransmitted. Currently, the second PDN gateway $150_2$ might handle such an overflow or pseudo-overflow using a standard Internet Protocol (IP) flow control mechanism. With such a mechanism, bearers 210 with high traffic rates will experience larger delays or more packet dropping than bearers 210 with low traffic rates. As a result, the transport or application layer of one or more of the senders (the second UE $110_2$ and the third UE $110_3$ in this case) will correspondingly adjust the rate at which the sender sends data. However, the IP flow control-based method may respond slowly to the AMBR overflow or pseudo-overflow at the PDN gateway $150_2$. Moreover, the waste associated with packet retransmission due to packet dropping at the second PDN gateway $150_2$ still might not be avoided. Further, significant radio resources may be wasted in this case due to the packet dropping in the core network.

In an embodiment, a proactive uplink AMBR rate enforcement procedure is provided in which the ENBs 120 can make use of overall system information on non-GBR traffic to prevent uplink traffic from exceeding an AMBR. As result, AMBR overflow or pseudo-overflow issues at the PDN gateways 150 can be avoided or alleviated. When one of the PDN gateways 150 receives total non-GBR traffic that exceeds a first threshold, the PDN gateway 150 sends a message to one or more of the ENBs 120 from which it is receiving traffic informing the ENBs 120 that it is receiving excessive traffic. The first threshold might be the AMBR for that PDN gateway 150 or might be a portion of the AMBR (e.g., 95% of the configured AMBR). The message can be referred to as an "AMBR Overflow Indication (Congestion)" message. In some cases, the PDN gateway 150 sends the message to all of the ENBs 120 from which it is receiving traffic, and in some cases, the PDN gateway 150 sends the message to only one or only a portion of the ENBs 120 from which it is receiving traffic.

The ENBs 120 that receive the AMBR Overflow Indication (Congestion) message can then notify the UEs 110 under their control to decrease the UEs' traffic to the UEs' respective ENBs 120. In some embodiments, the ENBs can inform their respective UEs 110 to slow down the uplink traffic from the UEs 110 to the ENBs 120. In other embodiments, the ENBs 120 can instruct the UEs 110 to modify the manner in which the UEs 110 handle the buffering of uplink traffic to the ENBs 120. In still other embodiments, the ENBs 120 might buffer the data from the UEs 110 and decrease the forwarding rate of the data to the PDN gateway 150. The procedure for adjusting the uplink data flow rate can be implementation-dependent.

As a result of the actions taken by the ENBs 120 upon receiving the AMBR Overflow Indication (Congestion) messages, the total traffic to the PDN gateway 150 that was in an overflow or pseudo-overflow condition might decrease. When the non-GBR traffic to one of the PDN gateways 150 that previously had traffic above the first threshold falls below a second threshold, the overflow or pseudo-overflow condition can be defined to no longer exist on that PDN gateway 150. To prevent frequent oscillation between an overflow or pseudo-overflow condition and a non-overflow condition, the second threshold can be set at an appropriate level below the first threshold. For example, if the first threshold is 95% of the AMBR, the second threshold might be set at 90% of the AMBR.

In an embodiment, when an overflow or pseudo-overflow no longer exists on one of the PDN gateways 150, the PDN gateway 150 can send a message to the ENBs 120 that are sending data to the PDN gateway 150. The message, which might be referred to as an "AMBR Overflow Indication (Cleared)" message, can inform the ENBs 120 that the actions that the ENBs 120 took to decrease their UEs' traffic to the ENBs 120 can be terminated. To avoid a "ping-pong" effect, the ENBs 120 may not increase the UE's traffic immediately after the reception of the "AMBR Overflow Indication (Cleared)" message and may increase the traffic through a slow, step-by-step procedure.

In an alternative embodiment, the PDN gateway 150 does not send the AMBR Overflow Indication (Cleared) message to the ENBs 120. Instead, after a defined period of time has elapsed since the ENBs 120 received the AMBR Overflow Indication (Congestion) message, the ENBs 120 can allow the uplink non-GBR traffic from the UEs 110 to the PUN gateway 150 to increase in a slow, step-by-step manner. The increase can continue until the AMBR of the PDN gateway 150 is reached or until the ENBs 120 receive another AMBR Overflow Indication (Congestion) message from the PDN gateway 150.

Figure 3:
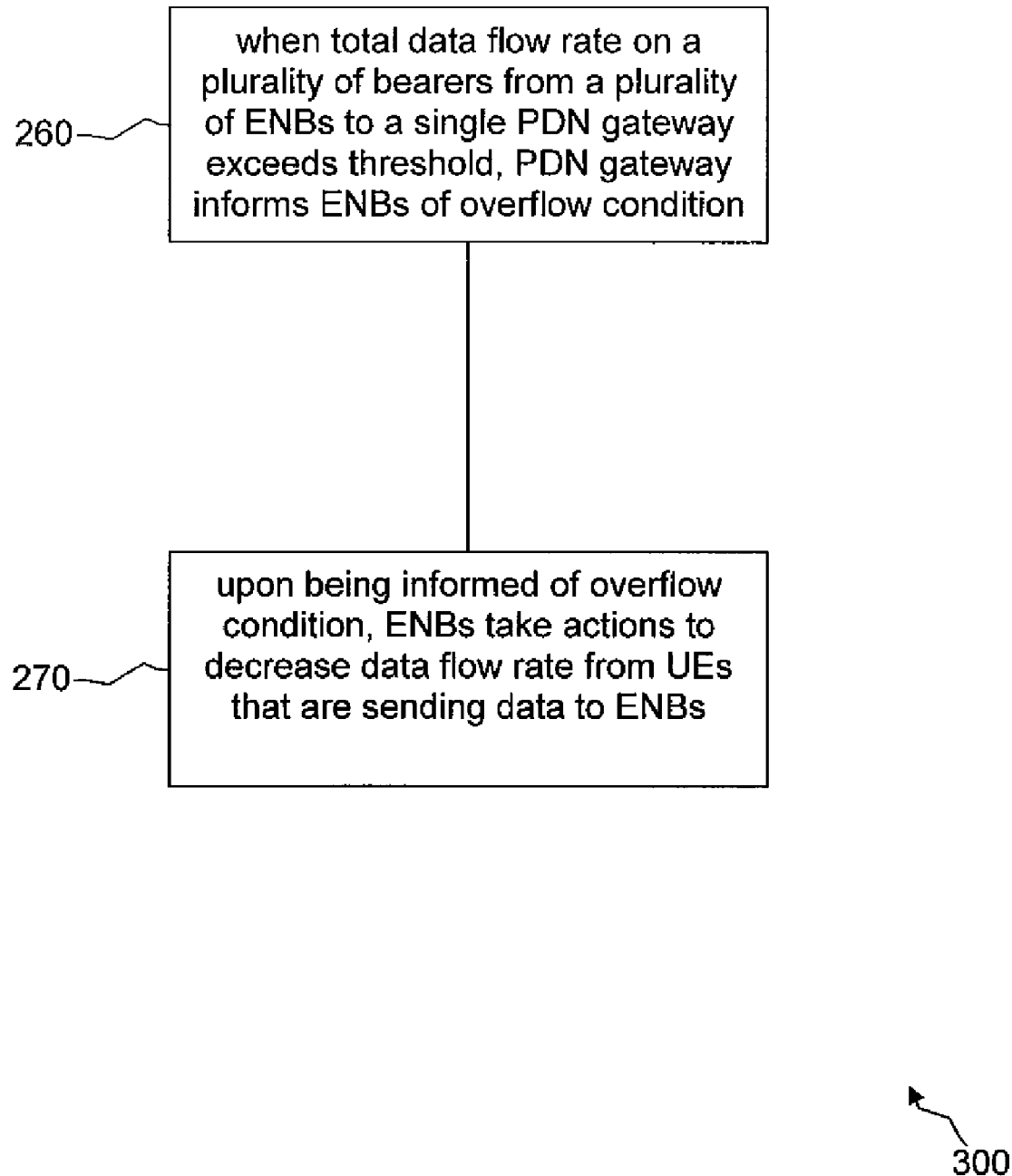
FIG. 3 is a diagram of a method for enforcing a proactive uplink AMBR rate according to an embodiment of the disclosure.

FIG. 3 illustrates an embodiment of a method 300 for proactive uplink AMBR rate enforcement. At block 260, when the total data flow rate on a plurality of bearers from a plurality of ENBs to a single PDN gateway exceeds a threshold, the PDN gateway informs the ENBs of an overflow condition. At block 270, upon being informed of the overflow condition, the ENBs take actions to decrease the data flow rate from the UEs that are sending data to the ENBs.

Figure 4:
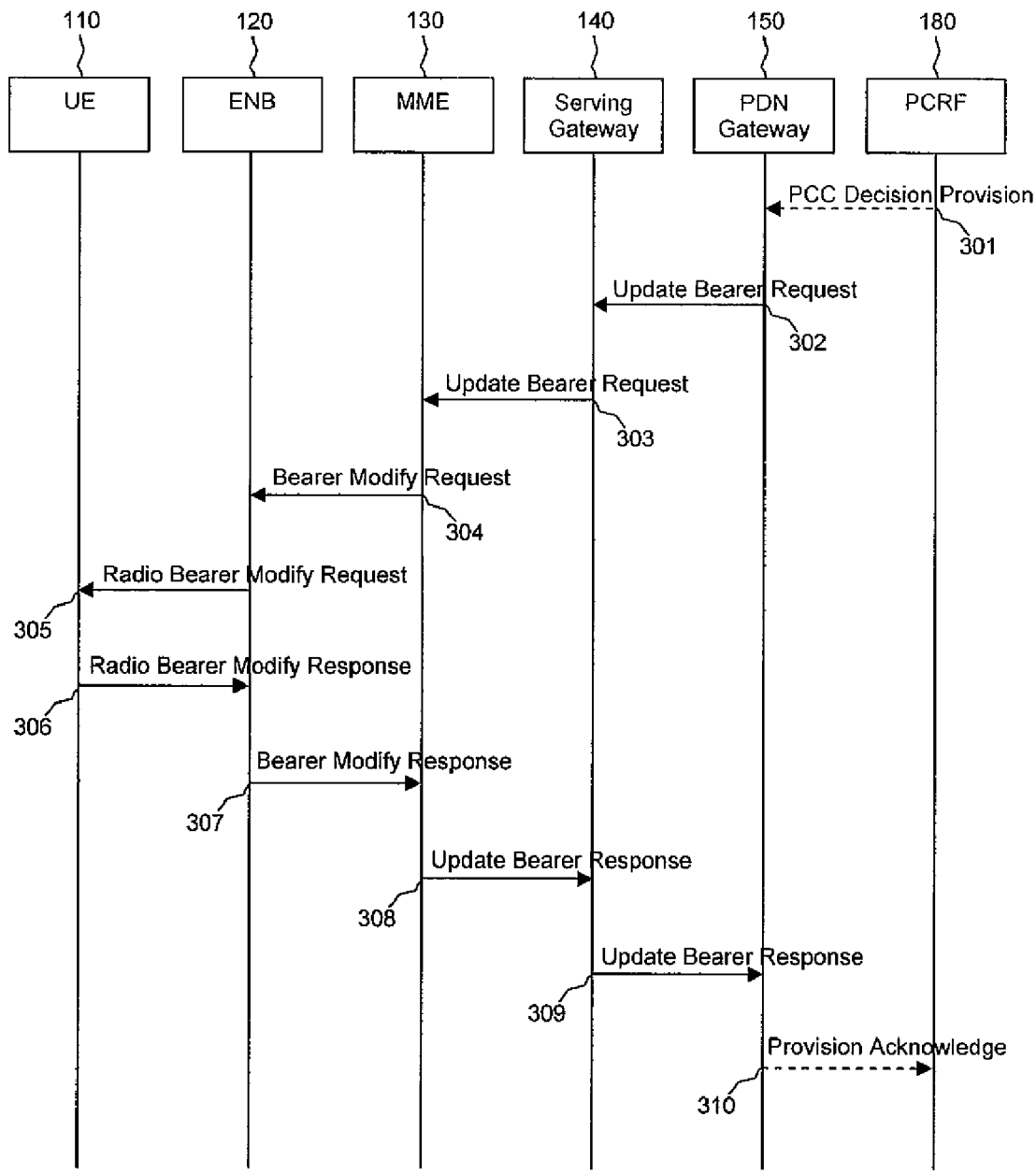
FIG. 4 is a call flow diagram for signaling an AMBR overflow status from a PDN gateway to an ENB according to an embodiment of the disclosure.

The signaling of the AMBR overflow or pseudo-overflow status from the PDN gateway 150 to the ENB 120 can be implemented through a modification of a known procedure for PDN gateway-initiated bearer modification. A call flow diagram for a PDN gateway-initiated bearer modification procedure that includes signaling related to AMBR overflow or pseudo-overflow status is depicted in FIG. 4.

At event 301, if dynamic PCC is deployed, the PCRF 180 sends a PCC Decision Provision message to the PDN gateway 150. If dynamic PCC is not deployed, the PDN gateway 150 may apply local QoS policy. At event 302, the PDN gateway 150 uses the QoS policy to determine that a service data flow is to be aggregated to or removed from an active bearer. The PDN gateway 150 generates an uplink traffic flow template (TFT) and updates the bearer QoS to match the aggregated set of service data flows. When AMBR overflow or pseudo-overflow occurs, the PDN gateway 150 sends an Update Bearer Request message containing an AMBR overflow indication to the serving gateway 140.

At event 303, the serving gateway 140 sends the Update Bearer Request message with the AMBR overflow indication to the MME 130. At event 304, the MME 130 builds a Session Management Configuration that includes the AMBR overflow indication. The MME 130 then sends a Bearer Modify Request message with the Session Management Configuration to the ENB 120.

At event 305, the ENB 120 maps the modified bearer QoS to the radio bearer QoS. The ENB 120 then sends a Radio Bearer Modify Request message containing the Session Management Configuration to the UE 110. The UE 110 can store the information it receives in the Session Management Configuration for use when accessing via Evolved UTRAN or GERAN or UTRAN. At event 306, the UE 110 acknowledges the radio bearer modification to the ENB 120 with a Radio Bearer Modify Response (Session Management Response) message. Events 305 and 306 are optional since the ENB 120 is not required to notify the UE 110 with regard to the AMBR overflow status.

At event 307, the ENB 120 acknowledges the bearer modification to the MME 130 with a Bearer Modify Response message. With this message, the ENB 120 indicates whether the requested bearer QoS could be allocated or not. At event 308, the MME 130 acknowledges the bearer modification to the serving gateway 140 by sending an Update Bearer Response message. At event 309, the serving gateway 140 acknowledges the bearer modification to the PDN gateway 150 by sending an Update Bearer Response message. At event 310, if the bearer modification procedure was triggered by a PCC Decision Provision message from the PCRF 180 at event 301, the PDN gateway 150 indicates to the PCRF 180 whether or not the requested PCC decision (QoS policy) could be enforced by sending a Provision Acknowledgement message to the PCRF 180. Additional related information is available in $3^{rd}$ Generation Partnership Project (3GPP) Technical Specification (TS) 23.401 which is incorporated herein by reference for all purposes.

Figure 5:
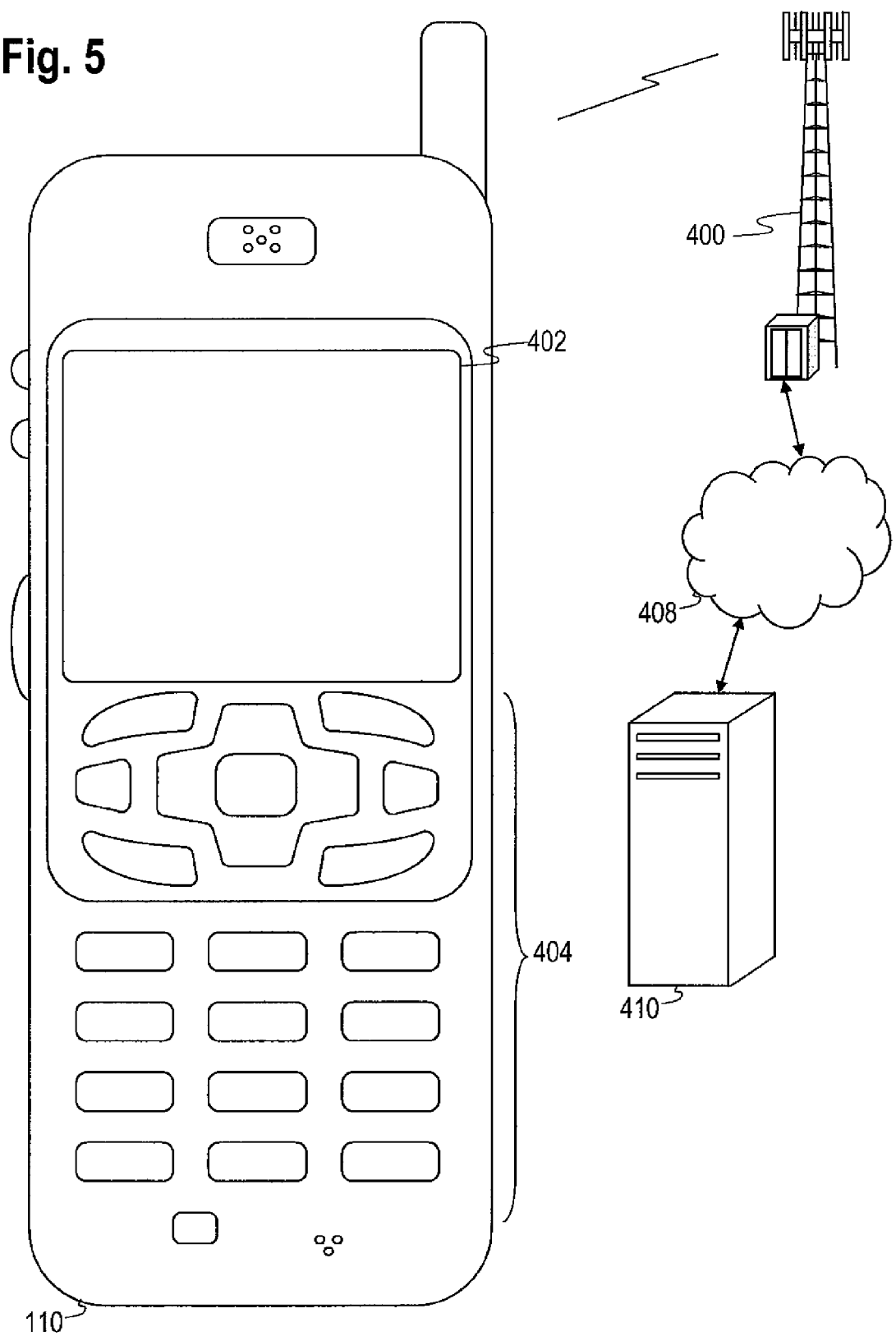
FIG. 5 is a diagram of a wireless communications system including user equipment operable for some of the various embodiments of the disclosure.

FIG. 5 illustrates a wireless communications system including an embodiment of the UE 110. The UE 110 is operable for implementing aspects of the disclosure, but the disclosure should not be limited to these implementations. Though illustrated as a mobile phone, the UE 110 may take various forms including a wireless handset, a pager, a personal digital assistant (PDA), a portable computer, a tablet computer, or a laptop computer. Many suitable devices combine some or all of these functions. In some embodiments of the disclosure, the UE 110 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 110 may be a portable, laptop or other computing device. The UE 110 may support specialized activities such as gaming, inventory control, job control, and/or task management functions, and so on.

The UE 110 includes a display 402. The UE 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 110 may present options for the user to select, controls for the user to actuate, and/or cursors or other indicators for the user to direct.

The UE 110 may further accept data entry from the user, including numbers to dial or various parameter values for configuring the operation of the UE 110. The UE 110 may further execute one or more software or firmware applications in response to user commands. These applications may configure the UE 110 to perform various customized functions in response to user interaction. Additionally, the UE 110 may be programmed and/or configured over-the-air, for example from a wireless base station, a wireless access point, or a peer UE 110.

Among the various applications executable by the UE 110 are a web browser, which enables the display 402 to show a web page. The web page may be obtained via wireless communications with a wireless network access node, a cell tower, a peer UE 110, or any other wireless communication network or system 400. The network 400 is coupled to a wired network 408, such as the Internet. Via the wireless link and the wired network, the UE 110 has access to information on various servers, such as a server 410. The server 410 may provide content that may be shown on the display 402. Alternately, the UE 110 may access the network 400 through a peer UE 110 acting as an intermediary, in a relay type or hop type of connection.

FIG. 6 shows a block diagram of the UE 110. While a variety of known components of UEs 110 are depicted, in an embodiment a subset of the listed components and/or additional components not listed may be included in the UE 110. The UE 110 includes a digital signal processor (DSP) 502 and a memory 504. As shown, the UE 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 110 to send and receive information from a cellular network or some other available wireless communications network or from a peer UE 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 110 and may also enable the UE 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 110 to communicate wirelessly with other nearby mobile devices and/or wireless base stations.

The input/output interface 518 may further connect the DSP 502 to the alert 526 that, when triggered, causes the UE 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 110 to determine its position. Various other peripherals may also be included to provide additional functions, e.g., radio and television reception.

FIG. 7 illustrates a software environment 602 that may be implemented by the DSP 502. The DSP 502 executes operating system drivers 604 that provide a platform from which the rest of the software operates. The operating system drivers 604 provide drivers for the UE hardware with standardized interfaces that are accessible to application software. The operating system drivers 604 include application management services ("AMS") 606 that transfer control between applications running on the UE 110. Also shown in FIG. 7 are a web browser application 608, a media player application 610, and Java applets 612. The web browser application 608 configures the UE 110 to operate as a web browser, allowing a user to enter information into forms and select links to retrieve and view web pages. The media player application 610 configures the UE 110 to retrieve and play audio or audiovisual media. The Java applets 612 configure the UE 110 to provide games, utilities, and other functionality. A component 614 might provide functionality related to AMBR enforcement.

Figure 8:
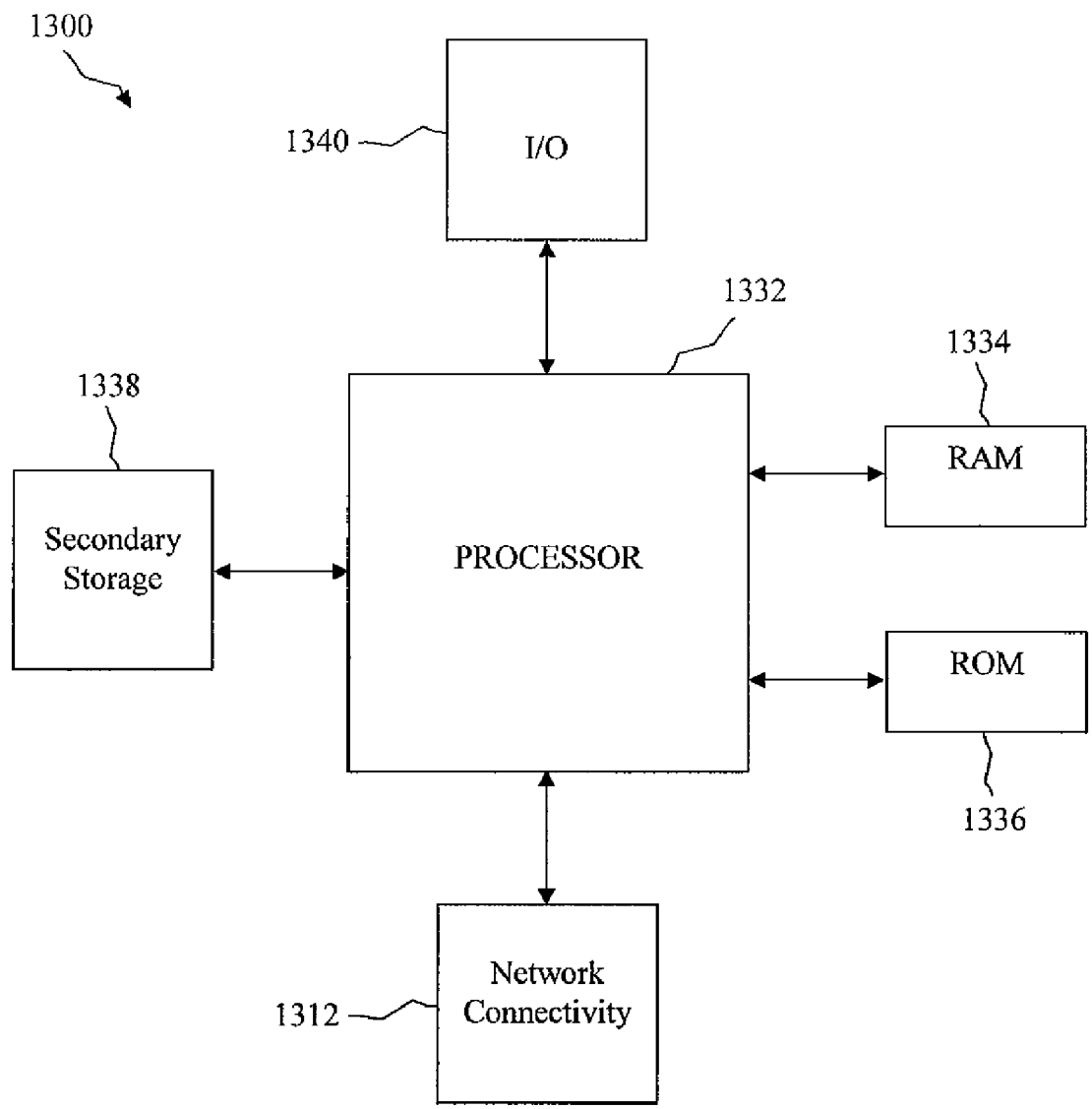
FIG. 8 is an illustrative general purpose computer system suitable for some of the various embodiments of the disclosure.

The components of FIG. 1 may include any general-purpose computer with sufficient processing power, memory resources, and network throughput capability to handle the necessary workload placed upon it. FIG. 8 illustrates a typical, general-purpose computer system suitable for implementing one or more embodiments disclosed herein. The computer system 1300 includes a processor 1332 (which may be referred to as a central processor unit or CPU) that is in communication with memory devices including secondary storage 1338, read only memory (ROM) 1336, random access memory (RAM) 1334, input/output (I/O) devices 1340, and network connectivity devices 1312. The processor 1332 may be implemented as one or more CPU chips.

The secondary storage 1338 is typically comprised of one or more disk drives or tape drives and is used for non-volatile storage of data and as an over-flow data storage device if RAM 1334 is not large enough to hold all working data. Secondary storage 1338 may be used to store programs which are loaded into RAM 1334 when such programs are selected for execution. The ROM 1336 is used to store instructions and perhaps data which are read during program execution. ROM 1336 is a non-volatile memory device which typically has a small memory capacity relative to the larger memory capacity of secondary storage. The RAM 1334 is used to store volatile data and perhaps to store instructions. Access to both ROM 1336 and RAM 1334 is typically faster than to secondary storage 1338.

I/O devices 1340 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 1312 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1312 may enable the processor 1332 to communicate with an Internet or one or more intranets. With such a network connection, it is contemplated that the processor 1332 might receive information from the network, or might output information to the network in the course of performing the above-described method steps. The network connectivity devices 1312 may also include one or more transmitter and receivers for wirelessly or otherwise transmitting and receiving signal as are well know to one of ordinary skill in the art.

Such information, which may include data or instructions to be executed using the processor 1332 for example, may be received from and outputted to the network, for example, in the form of a computer data baseband signal or signal embodied in a carrier wave. The baseband signal or signal embodied in the carrier wave generated by the network connectivity devices 1312 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or here-after developed, referred to herein as the transmission medium, may be generated according to several methods well known to one skilled in the art.

The processor 1332 executes instructions, codes, computer programs, scripts which it accesses from hard disk, floppy disk, optical disk (these various disk based systems may all be considered secondary storage 1338), ROM 1336, RAM 1334, or the network connectivity devices 1312. While only one processor 1332 is shown, multiple processors may be present. Thus, while instructions may be discussed as executed by a processor, the instructions may be executed simultaneously, serially, or otherwise executed by one or multiple processors.

The following are incorporated herein by reference for all purposes: 3$^{rd}$ Generation Partnership Project (3GPP) Technical Specification (TS) 23.401, 3GPP S2-081514, and 3GPP S2-081100.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for enforcing uplink aggregate maximum bit rate (AMBR) on non-guaranteed bit rate (non-GBR) traffic at a network gateway, comprising:
   receiving at the network gateway a total non-GBR traffic that exceeds a first threshold related to the AMBR, wherein the total non-GBR traffic comprises traffic over bearers from one or more of a plurality of network access nodes; and
   sending a non-GBR traffic flow rate overflow message to one or more of the plurality of network access nodes.

2. The method of claim 1, wherein the network gateway is a packet data network gateway.

3. The method of claim 1, wherein the plurality of network access nodes are a plurality of enhanced node B.

4. The method of claim 1, wherein the first threshold is one of:
   the AMBR applicable to the network gateway; and
   a portion of the AMBR applicable to the network gateway.

5. The method of claim 1, further comprising, when the total non-GBR traffic flow rate falls below a second threshold, the network gateway sending a second message to the one or more of the plurality of network access nodes to no longer restrict non-GBR traffic flow rates to the network gateway.

6. A method for enforcing an uplink aggregate maximum bit rate (AMBR) comprising:
   receiving an AMBR overflow message from a network gateway at one or more network access nodes; and
   responsive to receiving the AMBR overflow message, taking action to decrease a non-guaranteed bit rate (non-GBR) traffic flow rate from at least one user equipment (UE) that is sending non-GBR traffic to the one or more network access nodes.

7. The method of claim 6, wherein the network gateway is a packet data network gateway.

8. The method of claim 6, wherein the one or more network access nodes are enhanced node B.

9. The method of claim 6, wherein the action to decrease the non-GBR traffic flow rate comprises instructing the UE to decrease the non-GBR traffic flow rate from the UE to a corresponding network access node.

10. The method of claim 6, wherein the action to decrease the non-GBR traffic flow rate comprises instructing the UE on handling a buffer containing the data.

11. The method of claim 6, wherein the action to decrease the non-GBR traffic flow rate comprises buffering non-GBR traffic from the UE at the one or more network access nodes and decreasing the forwarding rate of non-GBR traffic from the UE to the network gateway.

12. The method of claim 6, further comprising receiving a second message at the one or more network access nodes to no longer restrict the non-GBR traffic flow rates to the network gateway.

13. The method of claim 6, further comprising, after a time period passes without restricting the non-GBR traffic flow rates to the network gateway, increasing the non-GBR traffic flow rate to the network gateway in a slow step-by-step manner until one of:
   the non-GBR traffic flow rate reaches the network gateway's AMBR; or
   the receipt of an additional AMBR overflow message.

14. A system comprising:
   a processor in a network gateway configured to:
   receive a total non-guaranteed bit rate (non-GBR) traffic flow rate that exceeds a first threshold related to an aggregate maximum bit rate (AMBR) applicable to the network gateway, wherein the total non-GBR traffic flow rate comprises traffic over bearers from one or more of a plurality of network access nodes; and
   inform the one or more of the plurality of network access nodes that are sending non-GBR traffic from at least one user equipment (UE) to the network gateway that the total non-GBR traffic flow rate exceeds the first threshold.

15. The system of claim 14, wherein the first threshold is one of:
   the AMBR applicable to the network gateway; and
   a portion of the AMBR applicable to the network gateway.

16. The system of claim 14, wherein, when the total non-GBR traffic flow rate from the one or more of the plurality of network access nodes to the network gateway falls below a second threshold, the processor is further configured to inform the one or more of the plurality of network access nodes that a decreased non-GBR traffic flow rate is no longer necessary.

17. The system of claim 14, wherein the plurality of network access nodes are enhanced node B.

18. The system of claim 14, wherein the network gateway is a packet data network gateway.

19. A system comprising:
   a processor related to a network access node configured, responsive to receiving a message from a network gateway that a total non-guaranteed bit rate (non-GBR) traffic flow rate exceeds a first threshold related to an aggregate maximum bit rate (AMBR), to decrease the non-GBR traffic flow rate to the network gateway.

20. The system of claim 19, wherein the first threshold is one of:
   the AMBR applicable to the network gateway; or
   a portion of the AMBR applicable to the network gateway.

21. The system of claim 19, wherein decreasing the non-GBR traffic flow rate comprises reducing the non-GBR traffic flow rate from one or more UEs by instructing the UEs to decrease the non-GBR traffic flow rate from the UEs to the network access node.

22. The system of claim 19, wherein decreasing the non-GBR traffic flow rate includes reducing the non-GBR traffic flow rate from one or more UEs by instructing the UEs on handling a buffer containing the data.

23. The system of claim 19, wherein decreasing the non-GBR traffic flow rate comprises buffering non-GBR traffic from UEs at the network access node and decreasing the forwarding rate of non-GBR traffic from the UEs to the network gateway.

24. The system of claim 19, wherein the processor is further configured to receive a signal from the network gateway when the total data flow rate to the network gateway falls below a second threshold, and responsive to receiving the signal, to discontinue decreasing the non-GBR traffic flow rate to the network gateway.

25. The system of claim 24, wherein further responsive to receiving the signal, the processor promotes increasing the non-GBR traffic flow rate to the network gateway in a step-by-step manner until one of:
   the non-GBR traffic flow rate reaches the network gateway's AMBR; and
   the network access node receives a message from the network gateway that the total non-GBR traffic flow rate again exceeds the first threshold.

26. The system of claim 19, wherein the network access node is an enhanced node B.

27. The system of claim 19, wherein the network gateway is a packet data network gateway.

* * * * *